United States Patent [19]

Pantzar

[11] Patent Number: 5,443,334
[45] Date of Patent: Aug. 22, 1995

[54] CUTTING INSERT WITH RECESS

[75] Inventor: Göran Pantzar, Årsunda, Sweden

[73] Assignee: Sandvik AB, Sandviken, Sweden

[21] Appl. No.: 185,380

[22] Filed: Jan. 24, 1994

[30] Foreign Application Priority Data

Jan. 27, 1993 [SE] Sweden .............................. 9300232-7

[51] Int. Cl.⁶ .............................................. B23C 5/02
[52] U.S. Cl. .................................. 407/113; 407/114; 407/42
[58] Field of Search ............... 407/113, 114, 115, 116, 407/42

[56] References Cited

U.S. PATENT DOCUMENTS

| | | |
|---|---|---|
| 4,597,695 | 7/1986 | Johnson ............................ 407/113 |
| 4,616,962 | 10/1986 | Ushijima et al. ................. 407/113 |
| 4,627,317 | 12/1986 | Komanduri et al. ............. 407/113 |
| 4,645,386 | 2/1987 | Smith ................................. 407/113 |
| 4,669,924 | 6/1987 | Benson ............................. 407/113 |
| 4,940,369 | 7/1990 | Aebi et al. . | |
| 5,052,863 | 10/1991 | Satran . | |
| 5,071,292 | 12/1991 | Satran . | |
| 5,108,234 | 4/1992 | Stojanovski ..................... 407/113 |
| 5,145,295 | 9/1992 | Satran ............................... 107/113 |
| 5,147,158 | 9/1992 | Riviére et al. ................... 407/113 |

FOREIGN PATENT DOCUMENTS

| | | |
|---|---|---|
| 0555192 | 8/1993 | European Pat. Off. . |
| 456564 | 2/1989 | Sweden . |
| 646691 | 5/1991 | U.S.S.R. . |

*Primary Examiner*—Jack W. Lavinder
*Attorney, Agent, or Firm*—Burns, Doane, Swecker & Mathis

[57] ABSTRACT

A cutting insert comprises an upper side or chip surface, a bottom surface and side faces extending between these two surfaces. At least one side face is provided with a first, possibly helically twisted relief surface and under this first relief surface, a secondary relief surface. Between these two relief surfaces a recess is provided. With this recess, all grinding in the immediate proximity of the cutting edge is avoided. Further, by providing the recess, it is also made possible to precisely position the insert in the milling cutter body, even when the first relief surface is helically twisted.

21 Claims, 3 Drawing Sheets

CUTTING INSERT WITH RECESS

BACKGROUND AND SUMMARY OF THE PRESENT INVENTION

The present invention relates to a cutting insert for chip forming machining tools, in particular milling cutters. The inserts are preferably produced by form-pressing and sintering of an insert forming powder. The insert comprises an upper chip surface, a lower planar bottom surface which is intended to be located in abutment with a cooperating bottom support surface of the machining tool, and at least one side surface extending between these surfaces. The side surface is adapted to be placed against at least one side abutment surface of the tool and is generally inclined at an acute angle in relation with the upper chip surface and at an obtuse angle in relation with the bottom surface. A cutting edge is formed along the transition line between the chip surface and the side surface, adjacent to which cutting edge a clearance surface is provided.

Such inserts are more and more produced by means of a direct pressing method at which a cemented carbide forming powder first is conferred the desired form in a pressing tool adapted for the purpose and subsequently is given final strength by sintering in an over at temperatures above 1000° C. The pressing operation has been sophisticated over the years and is today so well defined that the process provides good possibilities of shaping the cutting edge, adjacent chip forming surfaces, possible reinforcing chamfers and clearance surfaces with large exactitude. Moreover, even shrinking that occurs during the sintering is included into the computation for the pressing tool dimensioning.

Today's cutting geometries tend toward more and more positive cutting geometries, i.e., larger and larger angles between the cutting insert chip surface and a normal plane of the machined surface. The reason for this development in the insert geometry is to provide the advantages achieved therewith, such as small cutting forces and a low energy consumption, a well-defined cutting edge for high dimension precision, as well as greater liberty when selecting the clearance angle, while maintaining positive cutting geometry. In practice, the limit for the positivity of the chip surface is set by the strength of the cemented carbide, since the cutting edge angle becomes sharper and thereby weaker the more positive the chip surface is.

Positive rake angles also entail that the axial inclination of the cutting insert in the milling cutter body shall be as positive as possible. However, a drawback with increasing inclination angles in the milling cutter body is that the clearance or relief angle diminishes with increasing cutting depths. As an example, indexable inserts with square basic form and with a side length of 1.5 cm and mounted with 7° positive axial inclination in a milling body of 50 cm diameter have a clearance angle at the cutting insert corner of 10° while the corresponding angle at maximal cutting depth is 7°. If the same insert is leaned further in the same milling body, e.g., to 17 degrees positive axial angle, the clearance angle at maximal cutting depth diminishes to only 0.7°. This decreased angle must be compared with the fact that a satisfactory clearance angle should be at least about 7°. This inconvenience is further emphasized at small cutter body diameters.

It is well known to the person skilled in the art that sufficient clearance plays a decisive role for all cutting machining. Inadequate clearance with insufficient free play under the cutting edge results in an accelerated increase of flank wear on the insert and unacceptable vibrations. In addition, chipping, breakage or rupture of the cutting edge of the insert may occur. With the aim of trying to provide sufficient clearance at positive inclination of the inserts in the milling cutter body, a pressing of a helically twisted clearance surface under the cutting edge has been suggested. In this way, an essentially constant clearance toward the work piece is maintained despite the fact that the insert leans in the milling body.

However, a drawback of the twisted clearance is that a combination of a twisted clearance surface next to the cutting edge and a planar secondary clearance surface under the twisted clearance surface results in a transition or break line between these two clearance surfaces that is not straight and parallel with the cutting edge, but is curved. As a result of this curved break line, the width of the twisted clearance surface increases toward increasing cutting depth (see FIG. 1). This curved break line between the two clearance surfaces creates problems when determining where the abutment points or surfaces in the cutting insert pocket of the milling cutter body, for axial and radial positioning of the insert, shall be located. Moreover, for certain types of machining, for instance certain modes of face milling, the requirements on form and dimension precision have become more rigorous during recent years. In particular, positive cutting edges require a very high dimensional accuracy in order to guarantee a satisfactory function at small tool feeds. So far, these requirements on accuracy have been accomplished by so-called contour grinding, which means that each surface that adjoins the individual cutting edge is after-ground in a step after the sintering. However, a serious drawback of such a contour grinding is that it causes changes in the micro geometry of the cutting insert, i.e., in the surface structure of the cutting edge forming parts of the cutting inserts after a surface treatment, such as blasting, chamfering or deposition of a surface hardening layer, which surface treatment is normally effected as soon as possible after finished sintering. In this manner one may alter the width of occurring negative reinforcing chamfers, the distance from the cutting edge to the chip forming surfaces, as well as the clearance surface. For instance, a relief surface with an originally pressed, helically twisted shape will wholly or partly be ground away. In practice, these changes will likely cause the chip forming ability and chip forming function of the insert to deteriorate and its strength and tool life to be reduced.

Hence, a first object of the present invention is to avoid any form of grinding or other processing in the immediate proximity of the cutting edges.

Another object of the present invention is to enable an exact positioning of the axial and radial abutment points of a cutting insert in an insert pocket, in spite of a clearance surface which is not ground.

In a preferred embodiment, another object of the present invention is to enable an exact positioning of the axial and radial abutment points of the cutting insert in an insert pocket, even in the case of a helically twisted relief or clearance surface.

According to the present invention, these objects and others are realized. In accordance with the present invention any form of grinding or other processing is avoided in the immediate proximity of the cutting edges. In particular, by providing a recess in the side surface(s), the width of the clearance or relief surface becomes essentially constant, even when it is helically twisted. Furthermore, the clearance surface is not influenced in any way by the grinding of the underlying planar side surface, which therefore can be shaped in any desired manner in order to enable high dimensional accuracy at the axial and radial positioning of the cutting insert.

An additional advantage of the invention is that a large degree of liberty is made possible when selecting different clearances on the planar side surface without influencing the abutment height. Also, a further advantage is that the non-active cutting edges and their adjacent clearance surfaces do not press against the side support surfaces in the insert pocket. Therefore, no risk of damage to these surfaces in their non-active position exists.

Also according to the present invention, the clearance surface adjoining the cutting edge, also called the first clearance or relief surface, is preferably helically twisted. This twisting gives the further advantage of retaining the clearance angle substantially constant, despite the axial positive inclination of the cutting insert in the milling cutter body. However, the first relief could also be wholly planar and have a clearance angle of, for example, 5° to 25°, and preferably 5° to 15°.

BRIEF DESCRIPTION OF THE DRAWINGS

For illustrating but non-limiting purposes the invention will now be described in more detail in connection to the appended drawings which show a preferred embodiment, wherein like members bear like reference numerals, and wherein.

DETAILED DESCRIPTION OF THE PREFERRED EMBODIMENT

Figure 1:
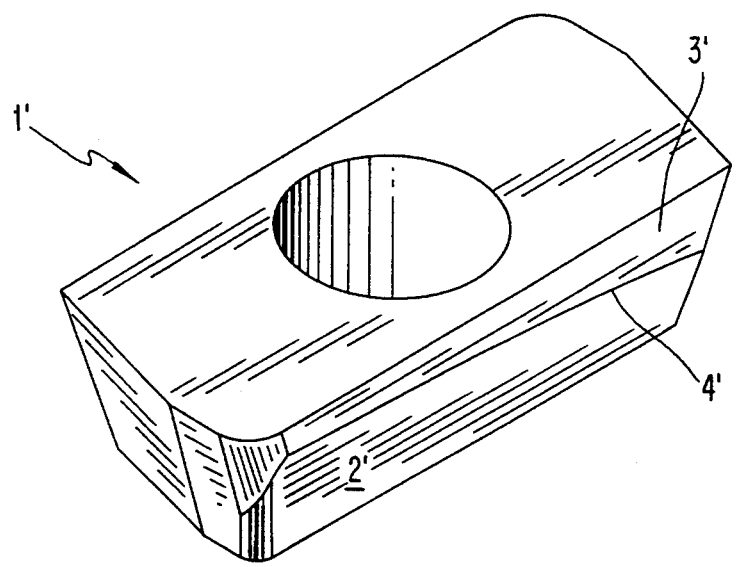
FIG. 1 is a view of an insert with helically twisted clearance or relief surface without a recess in the side surface.

With reference to FIG. 1, a standard insert 1' is provided with a non-standard clearance or relief surface 3' which is helically twisted with increasing clearance in the direction of increasing cutting depth. The relief surface 3' is adjacent the planar, secondary clearance surface 2'. Because of the twisted configuration of surface 3' a curved break line 4' is formed between the two clearance surfaces 2', 3'. The curvature of the break line 4' varies considerably with the grinding and the clearance angle of the surface 2'. The variation in curvature causes or exacerbates the above-mentioned difficulties at the determination of where the abutment points in axial and radial direction in an insert pocket of a milling machine (not shown) shall be placed.

Figure 2:
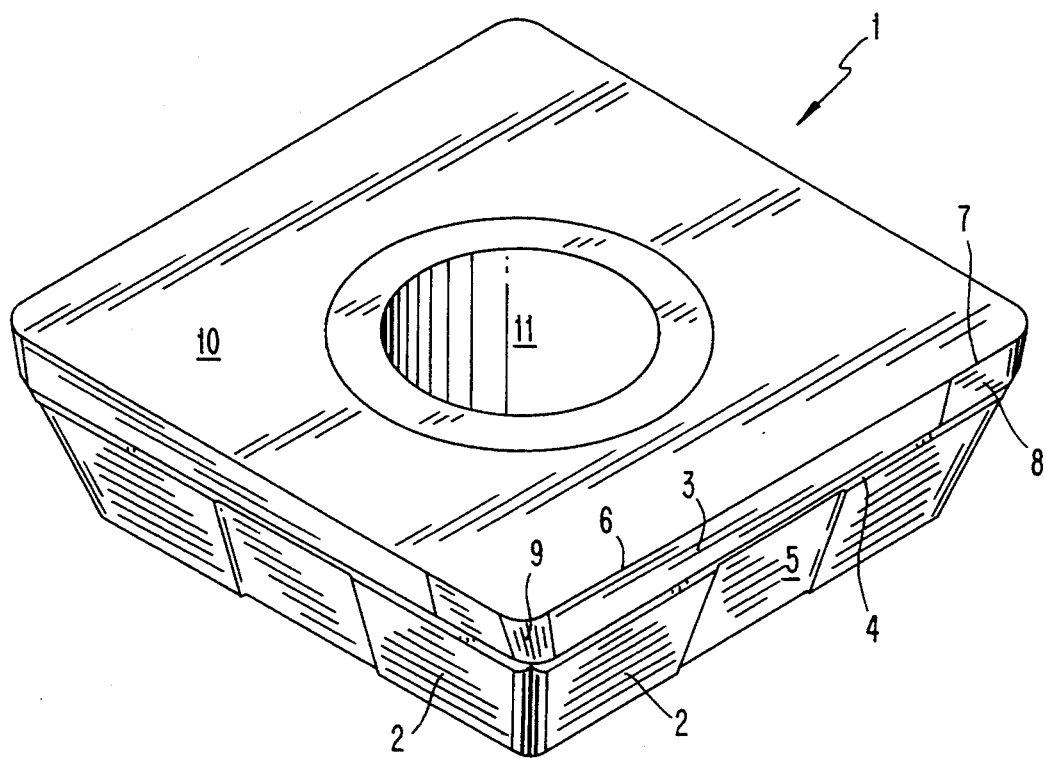
FIG. 2 is a perspective view of the insert according to the present invention from above.
Figure 3:
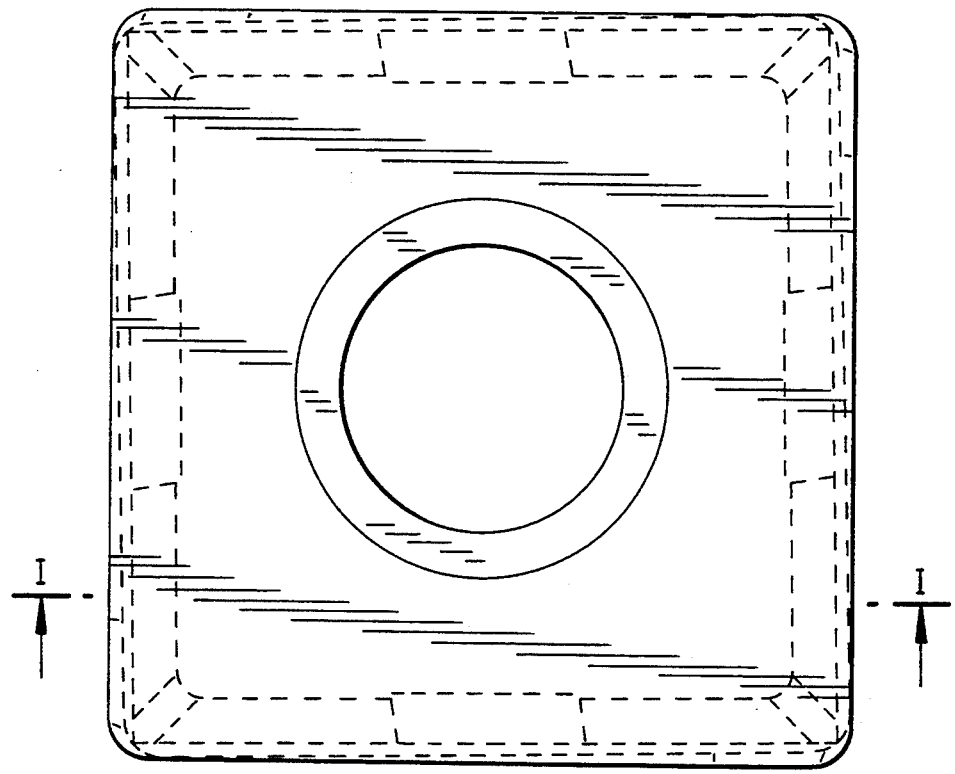
FIG. 3 is a top view of the insert according to the present invention.
Figure 4:
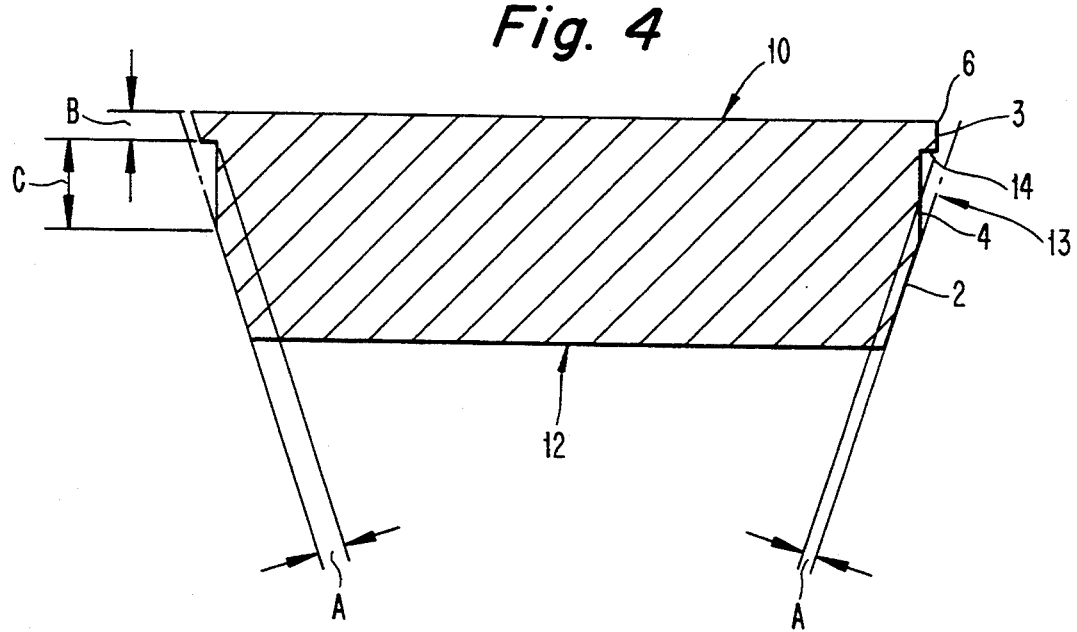
FIG. 4 is a cross-sectional view of the insert along the line I—I in FIG. 3.

FIGS. 2 to 4 illustrate an indexable cutting insert 1 according to the present invention, with a square basic form. Other overall shapes are also contemplated within the present invention.

The insert comprises an upper side or chip surface 10 and a planar underside or bottom surface 12 which is substantially plane-parallel with the chip surface 10. In the square basic form, four similar side faces extend between the chip surface 10 and the underside 12. In accordance with the invention, the side faces comprise a first relief or clearance surface 3, which preferably is helically twisted in such a manner that the clearance increases with increasing cutting depth. For example, the clearance angle nearest the operational cutting corner can be between 0° and 30°, preferably between 0° and 10°, and at the maximal cutting depth the angle is between 10° and 40°, preferably between 10° and 20°. With a negative axial inclination of the insert in the milling machine, the clearance surface 3 may be twisted in the opposite direction, with the degree of twisting being of the same order of magnitude as just mentioned above.

The side faces further include a secondary relief surface 2 and a recess 13 (FIG. 4) situated between these two relief surfaces. The recess preferably extends along the entire side surface length, from one cutting corner to the next cutting corner. The recess is defined by a surface 4, which, in a preferred embodiment, is substantially perpendicular to the upper and bottom surface 10, 12 of the insert, and by the surface 14 which, in a preferred embodiment, is substantially parallel with the upper and lower surfaces.

The height B of the clearance surface 3 (FIG. 4) constitutes suitably 8% to 20% of the total thickness of the cutting insert. In practice, the smallest height of the clearance surface 3 is determined by the strength of the cemented carbide used to form the insert. The height of the planar surface 4 (C in FIG. 4) constitutes suitably between 30 to 50% of the total thickness of the cutting insert. The criteria for determining the height of the surface 4 and the relief angle of the secondary clearance surface 2 is that together they provide a certain grinding allowance A on the surface 2, without encroaching on the clearance surface 3.

With the aim of reinforcing the protruding part defined by the surfaces 3, 10 and 14, the recess 13 can be provided with a suitable rounding or fillet along the break line between the surfaces 4 and 14.

Naturally, a grinding operation is resource demanding in both time and energy. In order to reduce time and energy consumption to a minimum, the sides of the insert can be formed with a preferably central recess 5 (FIG. 2) in connection with the form pressing operation. This recess 5 divides the ground surface 2 on each side surface of the insert into two part surfaces. In practice, the length of the recess 5 along the side can be allowed to amount to 25-35% of the whole length of the ground bottom surface 12.

Figure 5:
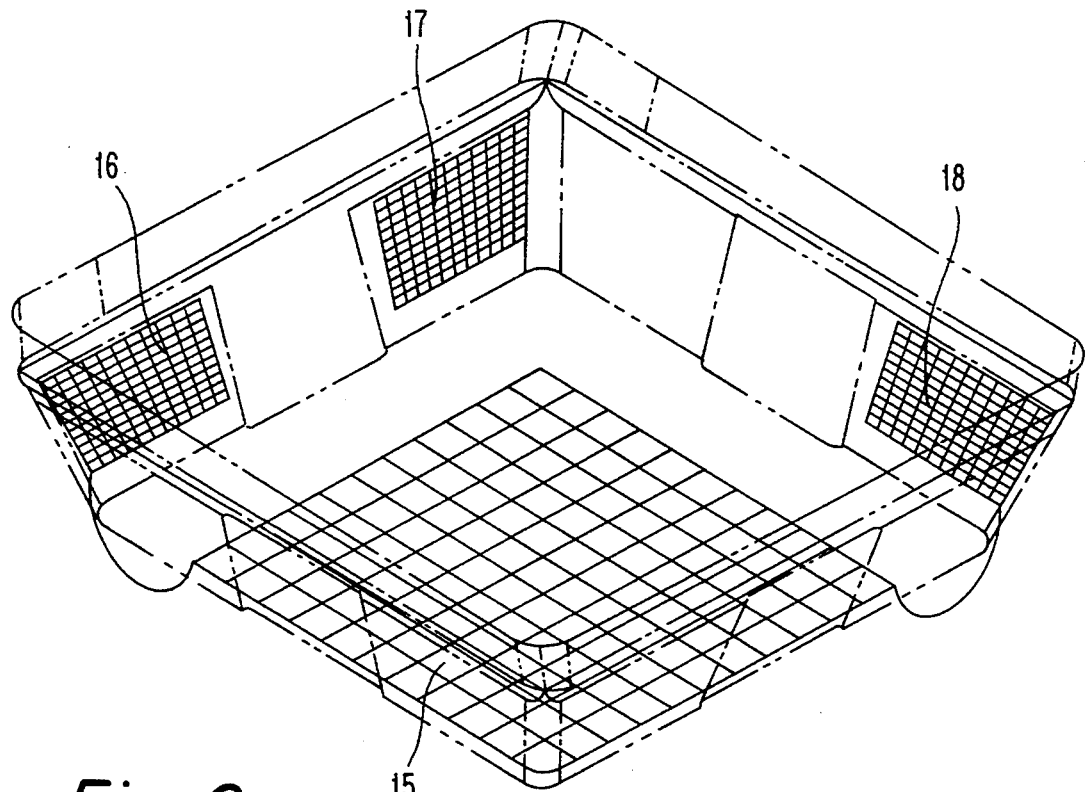
FIG. 5 is a view of a cutting insert pocket with a transparent insert according to the present invention.

The recess 13 enables a grinding of the side surfaces 2 to form abutment surfaces, while the surfaces 3 and 8 adjacent the main cutting edge 6 and the secondary cutting edge 7 are maintained intact in the same condition they existed after form pressing and sintering. This procedure ensures the attainment of very high dimension accuracy. Hence, the tolerances of the distance measure between the abutment points of the insert pocket and diametrically opposite cutting edge can be within the range of 1-20, suitably 1-10 μm. These results are best illustrated in FIG. 5, in which the two abutment points or abutment surfaces 16 and 17 of one support surface and an abutment surface 18 of the other side support surface are illustrated. The bottom support surface of the milling body of the milling machine has reference numeral 15. Due to the fact that the curved break line 4' in FIG. 1 does not arise, the support surfaces 16, 17 and 18 can be utilized over their whole extent for abutment against corresponding planar surface portions of the cutting insert side faces 2.

Figure 6:
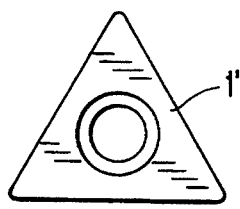
FIG. 6 is a schematic view of a second embodiment of an insert according to the present invention.

The insert according to the invention is preferably provided with a centrally situated through-hole 11, for insertion of appropriate clamping means 21 arranged in a milling cutter 22 (FIG. 6), such as a screw, a locking pin, etc.

Figure 8:
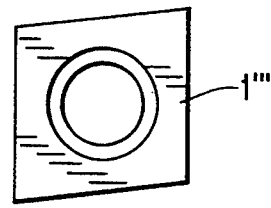
FIG. 8 is a schematic view of a fourth embodiment of an insert according to the present invention.
Figure 7:
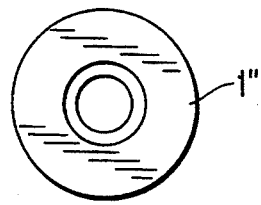
FIG. 7 is a schematic view of a third embodiment of an insert according to the present invention.

As a matter of course, the invention is not limited to the embodiment described and illustrated in the drawings. Thus, it is also possible to apply the invention on inserts with other polygonal basic forms than the specifically disclosed square configuration, for example, on triangular inserts 1' (FIG. 7). It would even be possible to prepare circular inserts 1" (FIG. 8) or rhomboidal 1''' (FIG. 9) with a circumferential recess. Moreover, the chip surface can be varied quite considerably. The chip surface could, for instance, be provided with geometries already known as such, such as a positive chip surface, chip breakers, dimples, ridges, bumps and the like.

According to the working example, the main cutting edge is completely straight. It can, however, also be slightly curved outwards in order to compensate for the positive axial inclination and to guarantee a complete planarity of the milled surface.

The principles, preferred embodiment and mode of operation have been described in the foregoing specification. However, the invention which is intended to be protected is not limited to the disclosed embodiments. Variations and changes may be made without departing from the spirit and scope of the claims appended hereto.

What is claimed is:

1. A cutting insert for chip forming machining tools, in particular milling cutters, comprising an upper chip surface, a planar bottom surface which is adapted to be located in abutment with a cooperating support surface of the machining tool, at least one side surface extending between the upper and lower surfaces, at least a portion of said one side surface being adapted to be placed in abutment with at least one cooperating side support surface of the machining tool, said at least one side surface being inclined at an acute angle in relation to the chip surface and at an obtuse angle in relation with the bottom surface, at least one cutting edge being formed along a transition line between the upper chip surface and said at least one side surface, a first relief surface being provided on said at least one side surface adjacent to the cutting edge, a secondary relief surface provided below said first relief surface, and a recess extending along at least a portion of the length of said at least one side surface between the first relief surface and the secondary relief surface, the plane of the secondary relief surface lying outside both the cutting edge and the plane of the first relief surface as viewed from a point substantially on a midpoint of the side surface of the cutting insert.

2. The insert according to claim 1, wherein the secondary relief surface is substantially planar.

3. The insert according to claim 1, wherein the secondary relief surface is ground.

4. The insert according to claim 1, wherein the recess is ground after forming the insert.

5. The insert according to claim 4, wherein the recess is displaced from the cutting edge such that grinding of said recess does not affect said cutting edge or said first relief surface.

6. The insert according to claim 1, wherein the recess extends along substantially the entire length of the side surface defining the cutting edge.

7. The insert according to claim 1, wherein the recess is located inside a plane of the secondary relief surface.

8. The insert according to claim 1, further comprising a second recess formed in said secondary relief surface.

9. The insert according to claim 8, wherein the secondary recess extends from the recess to the bottom surface.

10. The insert according to claim 8, wherein the secondary recess extends over 25% to 35% of a length of the bottom surface.

11. The insert according to claim 1, wherein the first relief surface is helically twisted.

12. The insert according to claim 1, wherein the recess includes a first surface which is substantially parallel to the bottom surface and is situated adjacent the first relief surface, and a second surface located between said first surface and the secondary relief surface, the second surface being substantially perpendicular to the bottom surface.

13. The insert according to claim 1, wherein the first relief surface is helically twisted such that the clearance increases with increasing cutting depth.

14. The insert according to claim 1, wherein the planes of the upper and bottom surfaces are parallel and wherein the recess includes a first surface that is generally perpendicular to the upper and bottom surfaces.

15. The insert according to claim 14, wherein the recess includes a second surface whose plane is substantially parallel to the planes of the upper and bottom surfaces.

16. The insert according to claim 1, wherein the insert is produced by press forming and sintering of an insert producing powder.

17. The insert according to claim 1, wherein the first relief surface extends over 8 to 20% of the thickness of the insert.

18. The insert according to claim 1, wherein the insert has a triangular shape.

19. The insert according to claim 1, wherein the insert has a rhombic shape.

20. The insert according to claim 1, wherein the insert has a rhomboidic shape.

21. The insert according to claim 1, wherein the insert has a rectangular shape.

* * * * *